United States Patent
Wu et al.

(10) Patent No.: US 12,432,313 B2
(45) Date of Patent: Sep. 30, 2025

(54) METHOD AND APPARATUS FOR ADJUSTING VIDEO BRIGHTNESS

(71) Applicants: Advanced Micro Devices, Inc., Santa Clara, CA (US); ATI Technologies ULC, Markham (CA)

(72) Inventors: Vickie Youmin Wu, Santa Clara, CA (US); Wilson Hung Yu, Markham (CA); Hakki Can Karaimer, Markham (CA); Hong Tao Yan, Markham (CA)

(73) Assignees: Advanced Micro Devices, Inc., Santa Clara, CA (US); ATI Technologies ULC, Markham (CA)

( * ) Notice: Subject to any disclaimer, the term of this patent is extended or adjusted under 35 U.S.C. 154(b) by 0 days.

(21) Appl. No.: 17/361,107

(22) Filed: Jun. 28, 2021

(65) Prior Publication Data

US 2022/0417466 A1    Dec. 29, 2022

(51) Int. Cl.
*H04N 5/57*    (2006.01)
*G06T 7/90*    (2017.01)
*H04N 9/73*    (2023.01)
*H04N 17/02*    (2006.01)

(52) U.S. Cl.
CPC ............... *H04N 5/57* (2013.01); *G06T 7/90* (2017.01); *H04N 9/73* (2013.01); *H04N 17/02* (2013.01); *G06T 2207/10016* (2013.01); *G06T 2207/10024* (2013.01)

(58) Field of Classification Search
CPC . H04N 5/57; H04N 9/73; H04N 17/02; G06T 7/90; G06T 2207/10016; G06T 2207/10024
See application file for complete search history.

(56) References Cited

U.S. PATENT DOCUMENTS

| | | | | |
|---|---|---|---|---|
| 6,611,297 B1* | 8/2003 | Akashi | ............. | H05B 47/10 348/739 |
| 8,222,837 B2* | 7/2012 | Galeazzi | ............. | H05B 45/20 315/318 |
| 8,228,353 B2* | 7/2012 | Kwisthout | ............. | H05B 47/155 345/77 |
| 8,648,844 B2* | 2/2014 | Mertens | ............. | G09G 3/3406 345/212 |
| 8,675,153 B2* | 3/2014 | Bruyneel | ............. | G02F 1/133603 349/68 |
| 2003/0146919 A1* | 8/2003 | Kawashima | ............. | H04N 5/74 348/E5.119 |
| 2005/0117813 A1* | 6/2005 | Nishida | ............. | H04N 5/57 348/E5.119 |
| 2006/0250323 A1* | 11/2006 | Wood | ............. | G09G 3/3406 345/30 |
| 2006/0268180 A1* | 11/2006 | Chou | ............. | G09G 3/3406 348/673 |
| 2007/0273686 A1* | 11/2007 | Watanabe | ............. | G06T 15/506 345/419 |

(Continued)

FOREIGN PATENT DOCUMENTS

WO    WO-2005062608 A2 *    7/2005    ............. G06F 1/1601

*Primary Examiner* — Michael Lee
(74) *Attorney, Agent, or Firm* — Volpe Koenig

(57) ABSTRACT

A method and apparatus for adjusting a display includes receiving a video stream. The video stream is analyzed for one or more environmental conditions. Based upon the analysis, a portion of the display is adjusted.

14 Claims, 6 Drawing Sheets

(56) References Cited

U.S. PATENT DOCUMENTS

| | | | |
|---|---|---|---|
| 2009/0161030 A1* | 6/2009 | Wang | F21V 29/763 |
| | | | 345/82 |
| 2010/0053229 A1* | 3/2010 | Krijn | G02B 6/0055 |
| | | | 315/294 |
| 2010/0165000 A1* | 7/2010 | Seuntiens | H04N 9/73 |
| | | | 345/690 |
| 2013/0147981 A1* | 6/2013 | Wu | G09G 3/20 |
| | | | 348/222.1 |
| 2018/0199410 A1* | 7/2018 | Liang | H05B 47/00 |
| 2020/0413020 A1* | 12/2020 | Huai | H04N 9/735 |
| 2022/0101804 A1* | 3/2022 | Chien | G06V 40/16 |

\* cited by examiner

METHOD AND APPARATUS FOR ADJUSTING VIDEO BRIGHTNESS

BACKGROUND

Due to the increased use of video conferencing, many users are conducting meetings online from their computers. They may be conducting the video conference meetings from their computers at their office or from home.

In some cases, the background lighting may cause the image of the subject in the video stream to appear darker or brighter than desired. Accordingly, the subject may not be viewed properly on screen to a viewer.

BRIEF DESCRIPTION OF THE DRAWINGS

A more detailed understanding can be had from the following description, given by way of example in conjunction with the accompanying drawings wherein.

DETAILED DESCRIPTION

Although the method and apparatus will be expanded upon in further detail below, briefly a method and apparatus for adjusting video brightness is described herein.

A method for adjusting a display includes receiving a video stream. The video stream is analyzed for one or more environmental conditions. Based upon the analysis, a portion of the display is adjusted.

An apparatus for adjusting a display includes an input device and a processor operatively coupled with and in communication with the input device. The processor is configured to receive a video stream captured by the input device, analyze the video stream for one or more environmental conditions, and based upon the analysis, adjust a portion of the display.

A non-transitory computer-readable medium for adjusting a display, the non-transitory computer-readable medium having instructions recorded thereon, that when executed by the processor, cause the processor to perform operations. The operations include receiving a video stream. The video stream is analyzed for one or more environmental conditions. Based upon the analysis, a portion of the display is adjusted.

Figure 1:
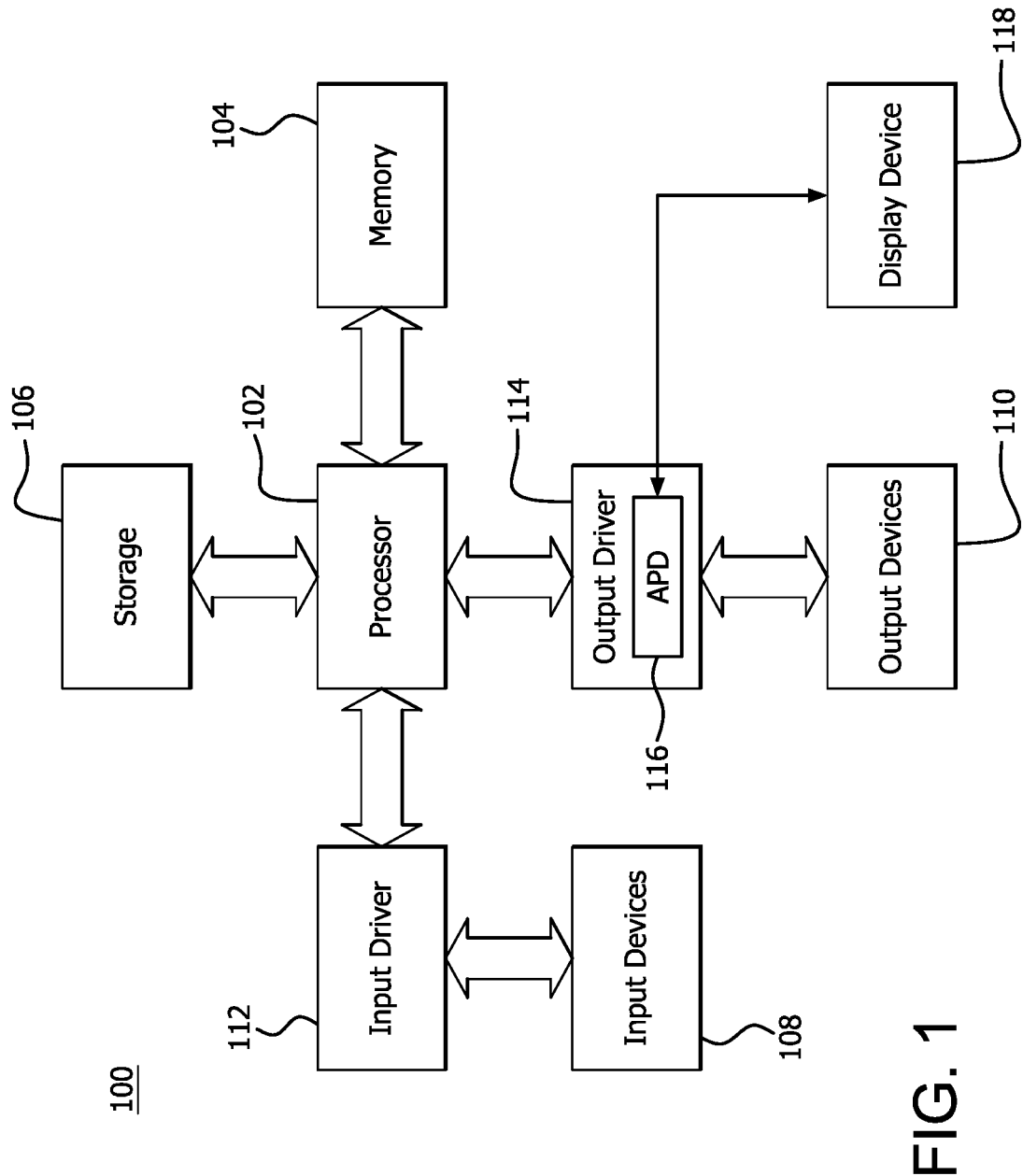
FIG. 1 is a block diagram of an example device in which one or more features of the disclosure can be implemented.

FIG. 1 is a block diagram of an example device 100 in which one or more features of the disclosure can be implemented. The device 100 can include, for example, a computer, a gaming device, a handheld device, a set-top box, a television, a mobile phone, a server, a tablet computer or other types of computing devices for generating graphics images. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102 or is located separately from the processor 102. The memory 104 includes a volatile or non-volatile memory, for example, random access memory (RAM), dynamic RAM, or a cache. In the embodiment illustrated in FIG. 1, processor 102 includes a CPU.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108 and permits the processor 102 to receive input from the input devices 108. The output driver 114 communicates with the processor 102 and the output devices 110 and permits the processor 102 to send output to the output devices 110. It is noted that the input driver 112 and the output driver 114 are optional components, and that the device 100 will operate in the same manner if the input driver 112 and the output driver 114 are not present. In the exemplary embodiment the output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm can perform the functionality described herein. Alternatively, it is contemplated that computing systems that do not perform processing tasks in accordance with a SIMD paradigm can also perform the functionality described herein.

Figure 2:
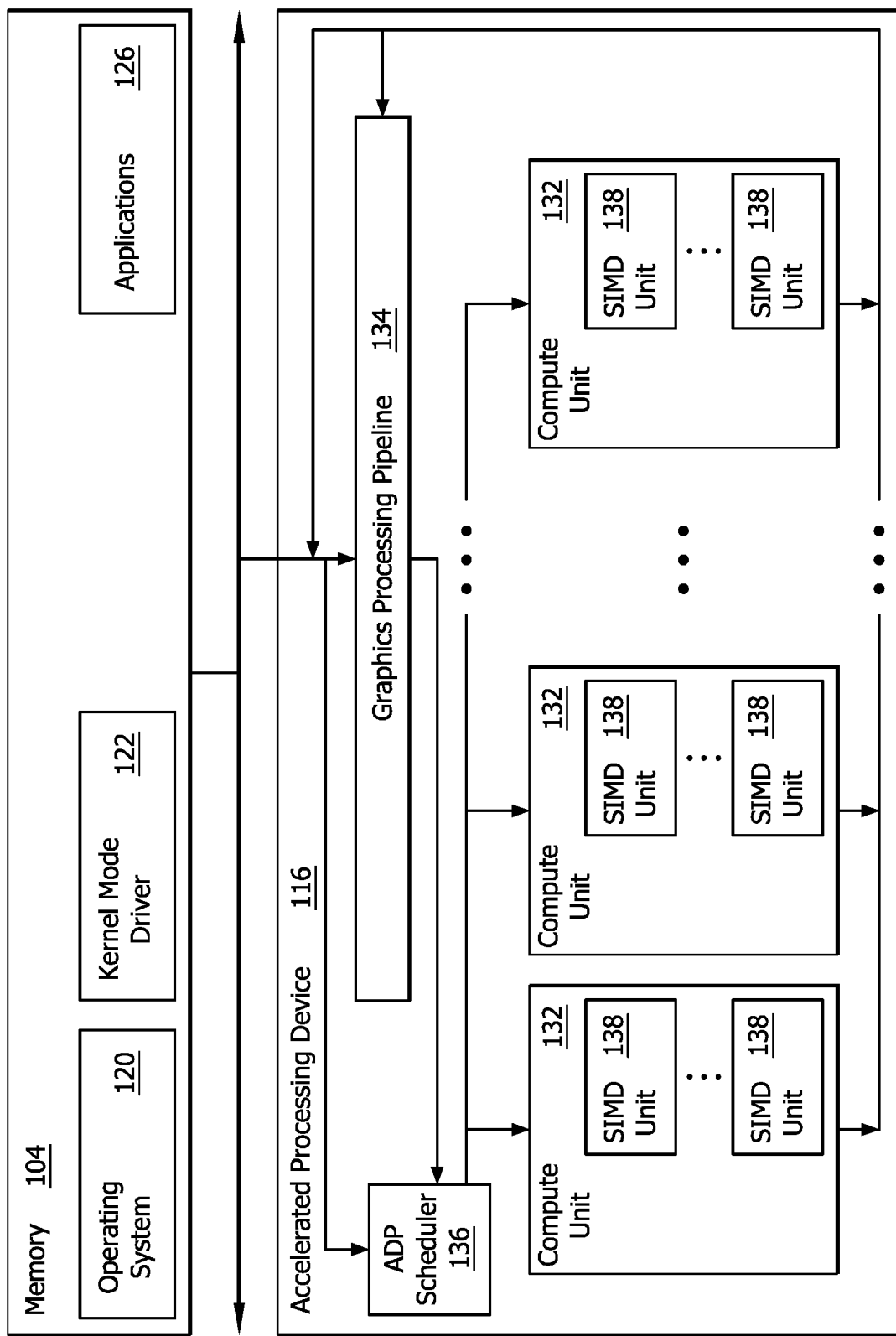
FIG. 2 is a block diagram of the device of FIG. 1, illustrating additional detail.

FIG. 2 is a block diagram of the device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that are or can be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that perform operations at the request of the processor 102 in a parallel manner according to a SIMD paradigm. The SIMD paradigm is one in which multiple processing elements share a single program control flow unit and program counter and thus execute the same program but are able to execute that program with or using different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed sequentially on a single SIMD unit 138 or partially or fully in parallel on different SIMD units 138. Wavefronts can be thought of as the largest collection of work-items that can be executed simultaneously on a single SIMD unit 138. Thus, if commands received from the processor 102 indicate that a particular program is to be parallelized to such a degree that the program cannot execute on a single SIMD unit 138 simultaneously, then that program is broken up into wavefronts which are parallelized on two or more SIMD units 138 or serialized on the same SIMD unit 138 (or both parallelized and serialized as needed). A scheduler 136 performs operations related to scheduling various wavefronts on different compute units 132 and SIMD units 138.

The parallelism afforded by the compute units 132 is suitable for graphics related operations such as pixel value calculations, vertex transformations, and other graphics operations. Thus, in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
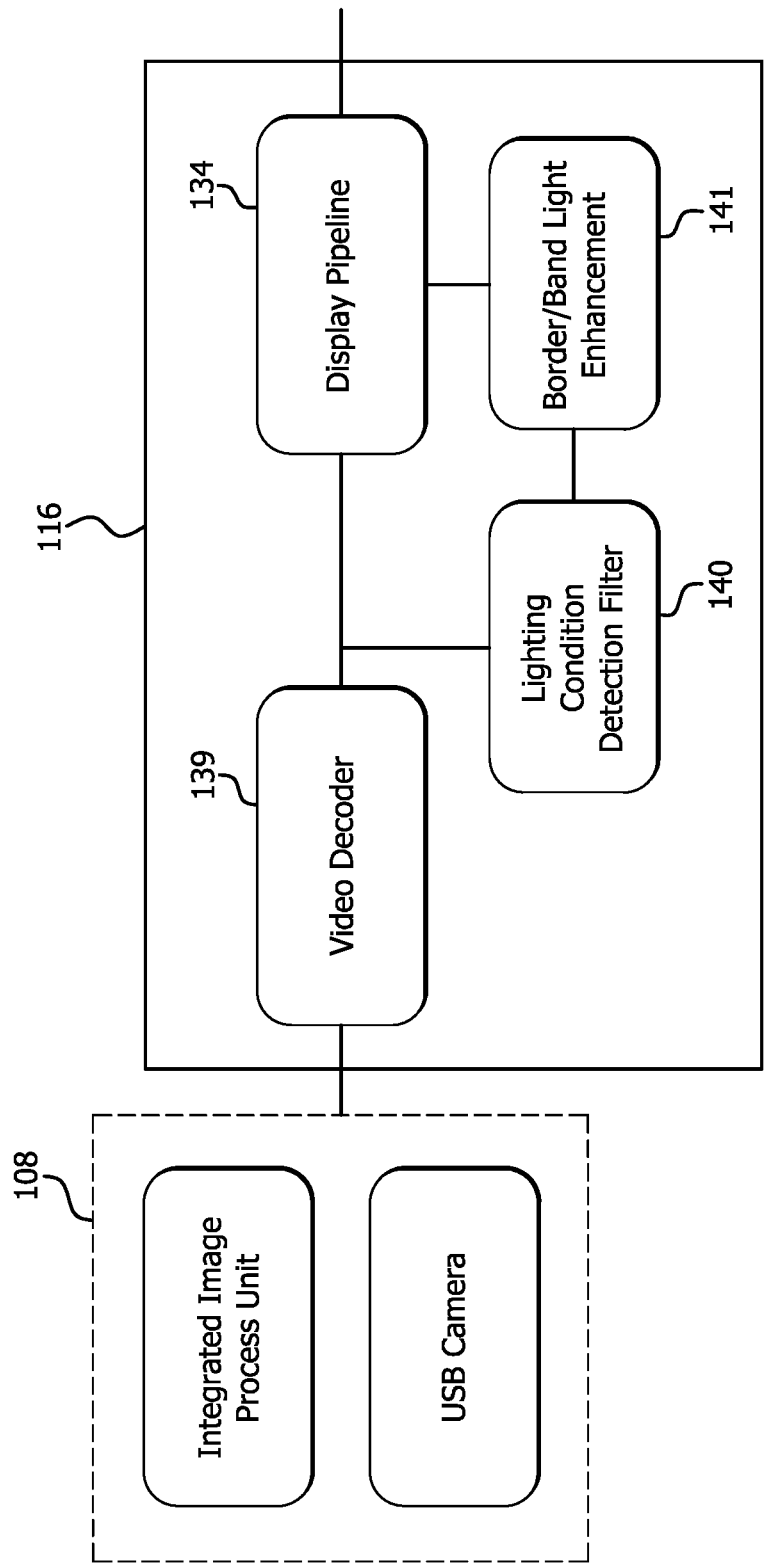
FIG. 3 is a block diagram illustrating a system for adjusting video brightness, according to an example.

FIG. 3 is a block diagram illustrating a system for adjusting video brightness, according to an example. The system includes the input devices 108 and the APD 116 from FIG. 1. For purposes of example, the input device 108 is a USB Camera that includes and integrated image processing unit, however any input device or camera may be utilized. The APD 116, which is in communication with the input device 108 receives image and video data from the input device 108. In the example shown in FIG. 3, the APD 116 includes the graphics processing pipeline 134 (indicated as the display pipeline) as well as a video decoder 139, lighting condition detection filter 140 and a border/band light enhancement component 141. The border/band light enhancement component 141 may be circuitry to perform the enhancement or controlled by software to control the display 118 to perform the method described herein below.

Figure 4:
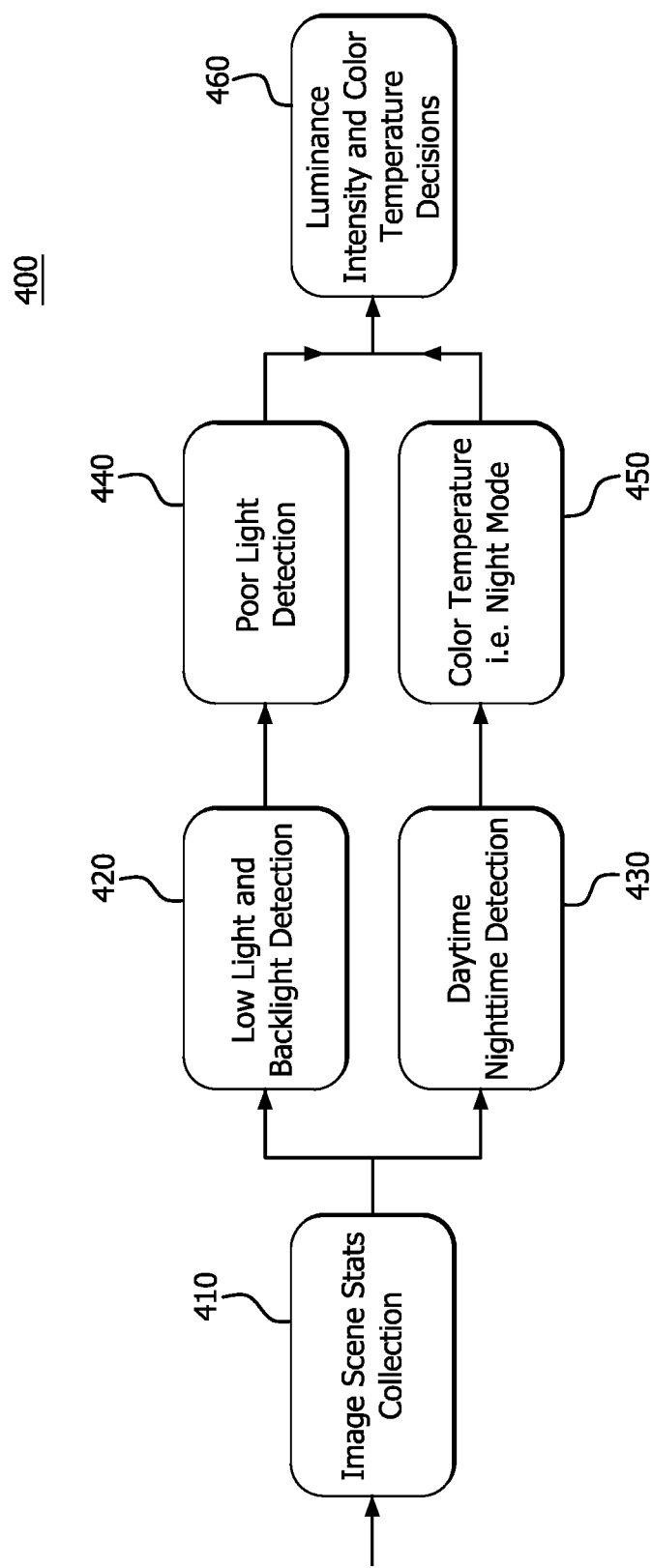
FIG. 4 is a graphical representation illustrating aspects related to a capturing and analyzing image information, according to an example.

FIG. 4 is a graphical representation 400 illustrating aspects related to a capturing and analyzing image information, according to an example. Although further detail relating to a method is described below, in 410, the image scene data are collected. From the image scene, low light and backlight detection 420 and daytime/nighttime detection 430 is performed. In 440, poor light detection is performed and in 450 color temperature is detected (i.e., whether or not night mode is active). Once these detections are performed, luminance intensity and color temperature decisions can be made in 460. These detections may be performed in the APD 116 or in the lighting condition detection filter 140, for example.

Figure 5:
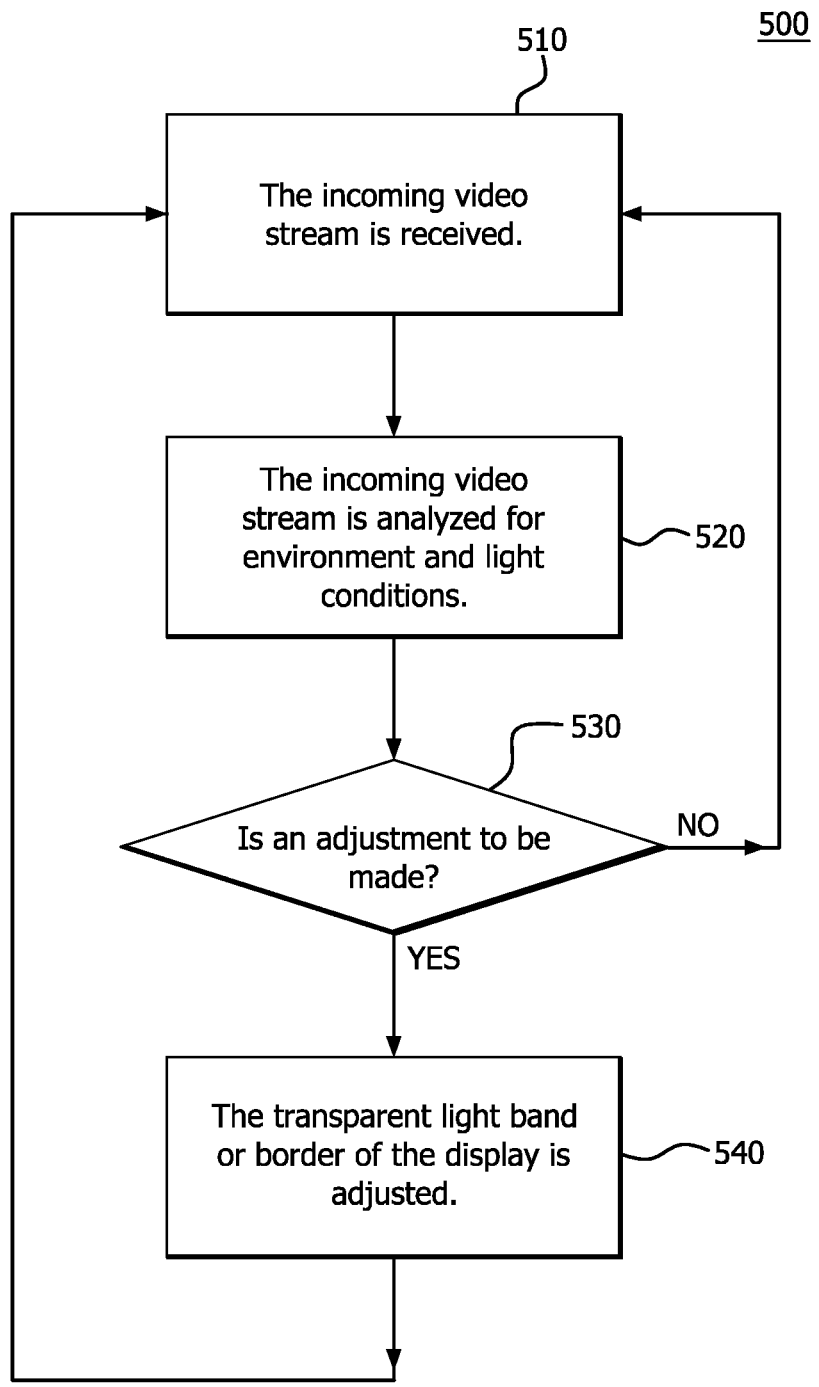
FIG. 5 is an example flow diagram of a method for adjusting video brightness.

FIG. 5 is an example flow diagram of a method 500 for adjusting video brightness. In step 510, the incoming video stream is received. This may be received from the input device 108 into the APD 116 as described above.

Once received, the incoming video stream is analyzed for environment and light conditions (step 520). For example, the detections described in FIG. 4 may be performed. That is, the frame luminous information in the video is analyzed to identify conditions such as, for example, low lighting conditions, the presence or absence of backlighting, and day/night information relating to whether or not the subject in the video is being imaged during the day or night.

In step 530, it is determined whether an adjustment is to be made. This may be accomplished by comparing the data collected and analyzed in steps 510 and 520 to determine if a light condition exists that would warrant an adjustment in order to provide a better lighting condition for the subject being captured by the input device 108. For example, the lighting condition data or color temperature data may be compared against a threshold to determine whether an adjustment should be made to the display.

If a determination is made that an adjustment need not be performed, then the method may revert back to step 510.

However, if an adjustment is to made (step 530), then the transparent light band or border of the display 118 is adjusted (step 540).

That is, in step 540, an alteration may be made to the transparent light band or border of the display 118 by adjusting the brightness of the band/border or by altering the color temperatures of the colors in the band to increase or decrease their color. That is, if the subject is required to be brighter, an increase in luminance/brightness or increase in color temperature is effected in the band/border. If the subject is too bright, then a decrease in luminance/brightness or decrease in color temperature is effected in the band/border. For example, if the subject is required to be brighter, an increase in luminance/brightness is applied in the band/border. The color temperature of the light source is the same as detected in (450) as default, but can be adjustable by a user through a user interface (UI).

Figure 6A:
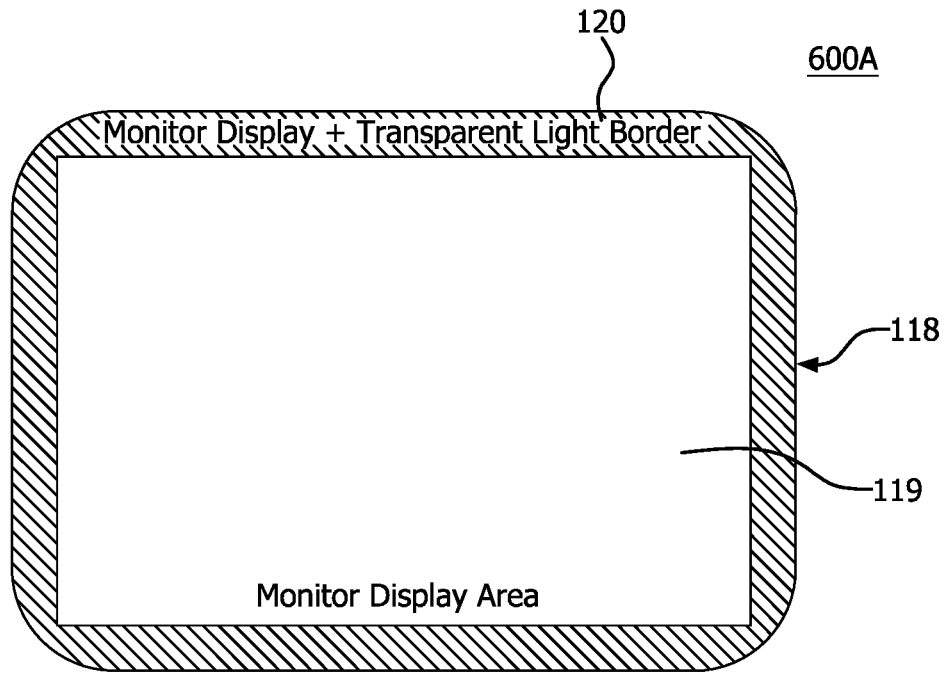
FIG. 6A is an example representation of a display in accordance with the method of FIG. 5.
Figure 6B:
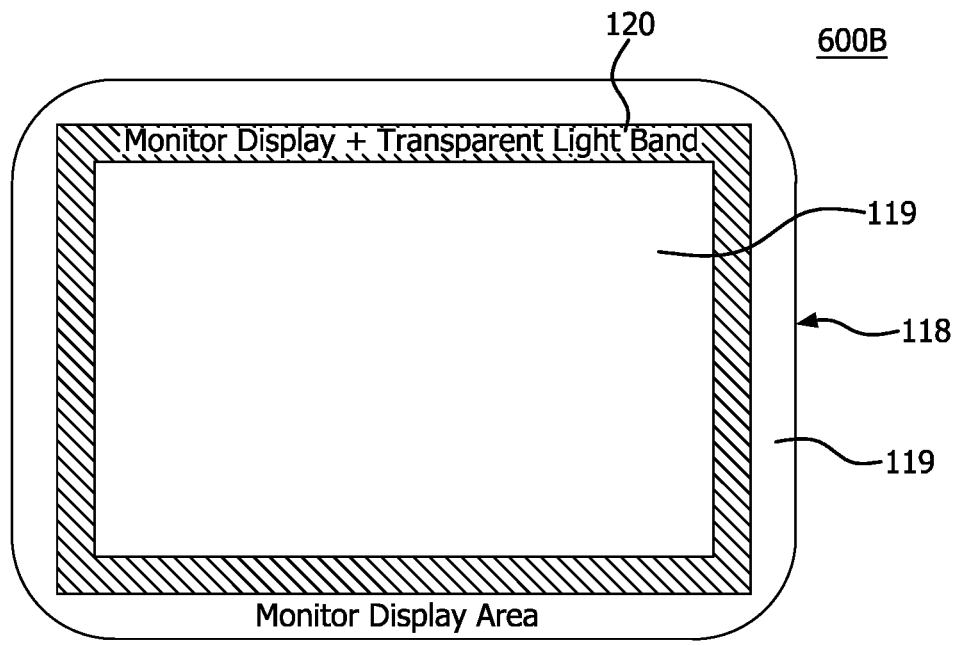
FIG. 6B is an alternate example representation of a display in accordance with the method of FIG. 5.

Specific examples of the adjustment to display 118 can be seen in FIGS. 6A and 6B. FIG. 6A is an example representation 600A of a display in accordance with the method of FIG. 5. FIG. 6B is an alternate example representation 600B of a display in accordance with the method of FIG. 5.

In FIG. 6A, the display 118 includes a monitor display area 119 for displaying the image and video on the display 118. A portion of the monitor display area includes the transparent light border 120, which borders the entire monitor display area 119. For example, the light border 120 is a group of pixels that are at a periphery of the display 118.

When a determination is made to adjust the border 120 in step 540 of method 500 above, the luminance of the border 120 is increased or decreased depending on the determination. Alternatively, the color temperature of the border 120 is increased or decreased depending upon the determination.

FIG. 6B is similar to FIG. 6A, however, instead of a transparent light border 120 that surrounds the entire monitor display area 119, a transparent light band 120 exists within the monitor display area. For example, the light band 120 of FIG. 6B exists close to the edge of the display 118, but does not include pixels at the edge of the display 118.

When a determination is made to adjust the band 120 in step 540 of method 500 above, the luminance of the border 120 is increased or decreased depending on the determination. Alternatively, the color temperature of the band 120 is increased or decreased depending upon the determination.

It should be understood that many variations are possible based on the disclosure herein. Although features and elements are described above in particular combinations, each feature or element can be used alone without the other features and elements or in various combinations with or without other features and elements. The increasing of the brightness and/or color temperature may be controlled by the system hardware or software which receives the information to adjust those areas within the display 118 to effect the adjustments mentioned above. Further, the determinations and control may be performed and effected by the graphics processing unit (GPU) such as APD 116.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, can be implemented as a general purpose computer, a processor, or a processor core, or as a program, software, or firmware, stored in a non-transitory computer readable medium or in another medium, executable by a general purpose computer, a processor, or a processor core.

The methods provided can be implemented in a general-purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for adjusting a display, comprising:
   receiving a video stream of a scene that is at least partially illuminated by the display;
   analyzing the video stream for lighting conditions in the scene, wherein the analyzing includes:
      comparing a color temperature of the scene with a first threshold,
      comparing a brightness of a subject in the scene with a second threshold, and
      detecting in the video stream any one of or any combination of: backlight, daytime conditions, or nighttime conditions; and
   based upon the analyzing, adjusting a respective brightness and a respective color temperature of a transparent light border that is integrated with the display and borders a portion of the display to modify illumination and color in the scene.

2. An apparatus for adjusting a display, the apparatus comprising:
   an input device; and
   a processor operatively coupled with and in communication with the input device, the processor configured to:
   receive a video stream captured by the input device, wherein the video stream is of a scene that is at least partially illuminated by the display;
   analyze the video stream for lighting conditions in the scene to generate an analysis result, wherein the analysis result is generated by:
      comparing a color temperature of the scene with a first threshold,
      comparing a brightness of a subject in the scene with a second threshold, and
      detecting in the video stream any one of or any combination of: backlight, daytime conditions, or nighttime conditions; and
   based upon the analyzing, adjust a respective brightness and a respective color temperature of a transparent light border that is integrated with the display and borders a portion of the display to modify illumination and color in the scene.

3. A non-transitory computer-readable medium for adjusting a display, the non-transitory computer-readable medium having instructions recorded thereon, that when executed by a processor, cause the processor to perform operations including:

receiving a video stream of a scene that is at least partially illuminated by the display;

analyzing the video stream for lighting conditions in the scene, wherein the analyzing includes:

comparing a color temperature of the scene with a first threshold, comparing a brightness of a subject in the scene with a second threshold, and detecting in the video stream any one of or any combination of: backlight, daytime conditions, or nighttime conditions; and based upon the analyzing, adjusting a respective brightness and a respective color temperature of a transparent light border that is integrated with the display and borders a portion of the display to modify illumination and color in the scene.

4. The method of claim 1, wherein adjusting the brightness and the color temperature of the transparent light border includes modifying a group of pixels at a periphery of the display.

5. The method of claim 1, wherein the transparent light border comprises a band of pixels adjacent to, but not at, an edge of a display area within the display.

6. The method of claim 1, further comprising presenting a user interface configured to allow manual adjustment of the color temperature or brightness of the transparent light border.

7. The method of claim 1, wherein the analyzing comprises identifying a face or human subject within the video stream and evaluating brightness of the identified subject.

8. The method of claim 1, wherein the comparing of the color temperature comprises determining whether the scene is in a warm or cool lighting condition.

9. The method of claim 1, wherein adjusting the brightness of the transparent light border comprises increasing brightness when low light or nighttime conditions are detected.

10. The apparatus of claim 2, wherein the transparent light border includes a plurality of edge pixels integrated into the display.

11. The apparatus of claim 2, wherein the processor is further configured to determine whether a face of the subject is underexposed and to increase the brightness of the transparent light border in response.

12. The apparatus of claim 2, wherein the input device comprises a USB camera including an integrated image processing unit.

13. The non-transitory computer-readable medium of claim 3, wherein the instructions further cause the processor to continuously monitor the scene and apply updated adjustments to the transparent light border at a fixed time interval.

14. The non-transitory computer-readable medium of claim 3, wherein the instructions further cause the processor to store lighting condition data for a plurality of frames and perform temporal smoothing of brightness or color temperature adjustments.

* * * * *